INVENTOR.
ROBERT H. ASHWORTH
By Martin J. Carroll
Attorney

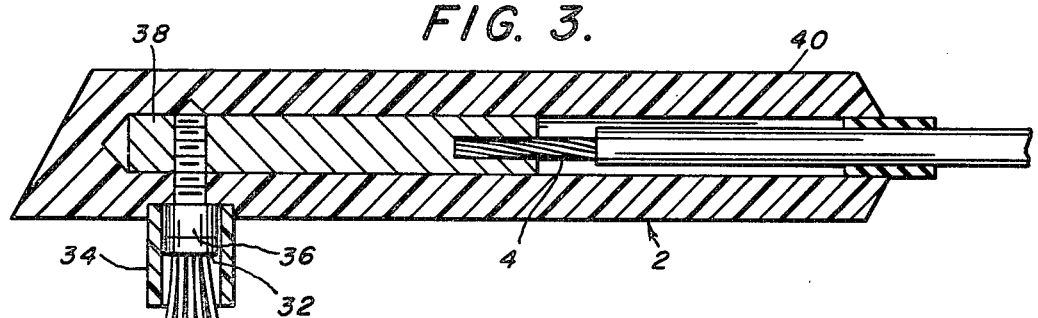
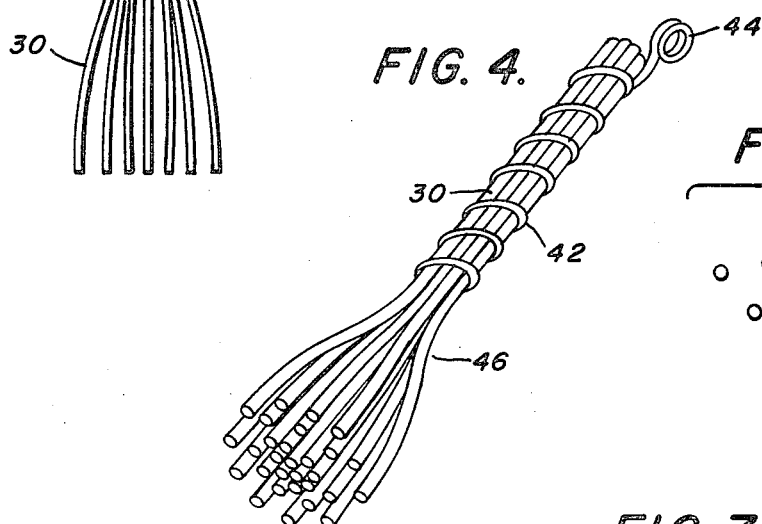
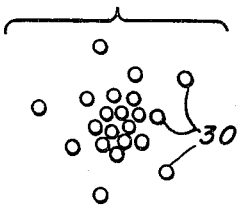
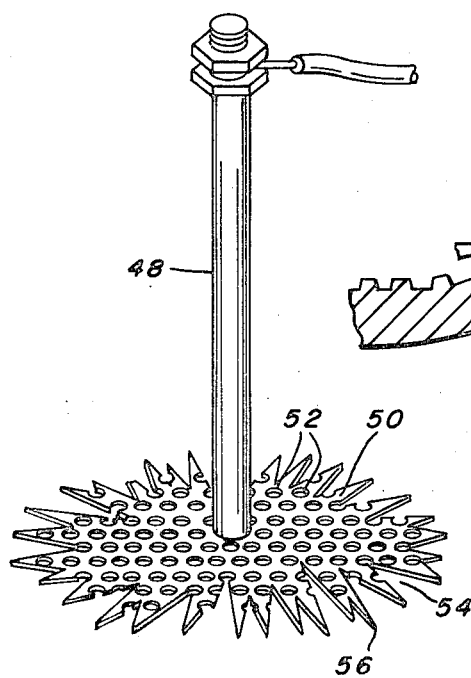
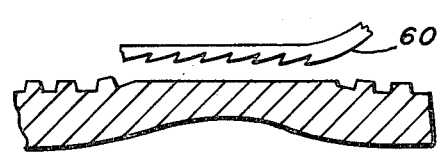
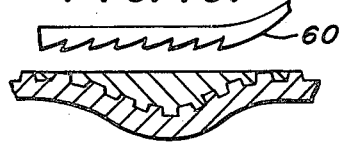

United States Patent Office 3,704,220
Patented Nov. 28, 1972

3,704,220
APPARATUS FOR ETCHING THE SURFACE OF A METAL WORKPIECE

Robert H. Ashworth, Penn Hills Township, Allegheny County, Pa., assignor to United States Steel Corporation
Filed Apr. 15, 1970, Ser. No. 28,901
Int. Cl. B23p 1/02; C23b 5/76
U.S. Cl. 204—224         7 Claims

ABSTRACT OF THE DISCLOSURE

The embossed surface of a metal workpiece is repaired by utilizing an electrode having relatively closely spaced discharge areas adjacent its center and relatively widely spaced discharge areas at its outer portion. A suitable stencil is placed on the surface to be repaired and a pad saturated with electrolytic fluid is placed on the stencil. The electrode and workpiece are connected to opposite poles of a D.C. power source and the free end of the electrode is pressed into the pad. During the repair embossing operation the electrode is occasionally lifted from the pad and then lowered into the pad in a slightly different position. The apparatus can also be used to emboss the plain surface of a metal workpiece.

---

This invention relates to apparatus for embossing the surface of a metal workpiece and more particularly to the repair of embossed metal sheets. Many of these sheets consist of a coined texture having a plurality of flat bottom embossments rolled into one of the flat surfaces of the sheet. The depth of the embossment may vary from a fraction of a thousandth of an inch to several thousandths of an inch. The term embossment is used in its broadest sense herein and includes any texture having high and low spots. The market for embossed sheets has been restricted because of the difficulty in repairing the sheet when it is damaged. For example, it is used in the automotive field, but without wide acceptance because dents occurring in the sheet before, during or after assembly are difficult to repair. Various procedures have been suggested for repairing the damaged portions, but all methods have been unsatisfactory for various reasons. Those methods which are relatively inexpensive did not produce the same texture as that of the original embossing. Those methods which can produce a satisfactory texture are too expensive, time consuming, and/or difficult to control.

Electrochemical etching was tried with apparatus and accessories such as shown in Lindsay Pat. No. 2,498,129 dated Feb. 21, 1950; Lindsay Pat. No. 2,405,508 dated Aug. 6, 1946; Lindsay Pat. No. 2,512,347 dated June 20, 1950; Lindsay Pat. No. 2,512,348 dated June 20, 1950; Lindsay Pat. No. 2,798,849 dated July 9, 1957. However, these trials failed because the texture obtained was not the same as the original texture. I have found that this failure was due mainly to the design of the usual electrode and partially to some of the manipulative steps, but that otherwise standard equipment and solutions could be used.

It is therefore an object of my invention to provide apparatus for embossing sheets which can be used to repair embossed sheets inexpensively while obtaining a satisfactory texture.

Another object is to provide a novel electrode for use in the repair or embossing of sheets.

These and other objects will be more apparent after referring to the following specification and attached drawings, in which:

FIG. 3 is a sectional view of an electrode of my invention;

FIG. 4 is a perspective view showing a second electrode of my invention;

FIG. 5 is an end view showing the arrangement of the wires of the electrodes of FIGS. 3 and 4;

FIG. 6 is a perspective view showing a third type of electrode of my invention;

FIG. 7 is a view showing a step in one method of my invention;

FIG. 8 is a view showing another step in the practice of the same method of my invention;

FIG. 9 is a view showing a step in a second method of my invention; and

FIG. 10 is a view showing a further step in the practice of the second method of my invention.

Figure 1:
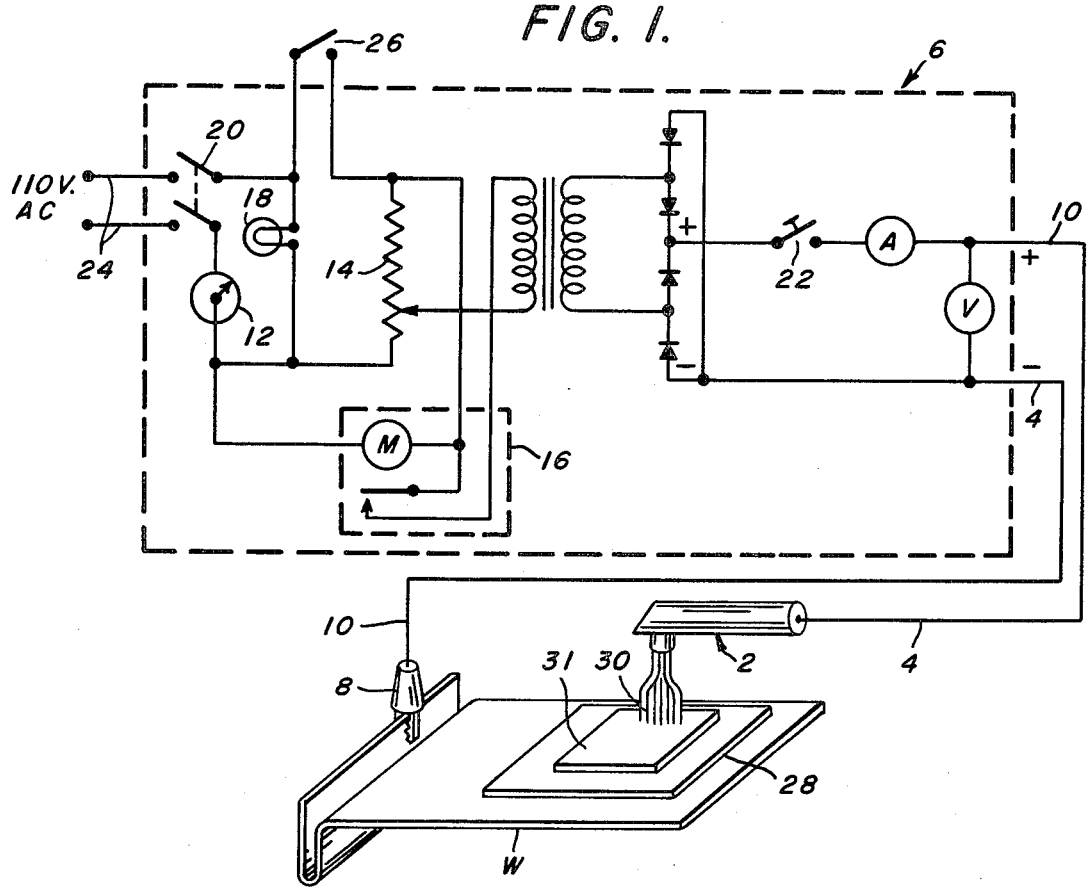
FIG. 1 is a schematic view of a D.C. power source connected to the apparatus used with my invention.
Figure 2:
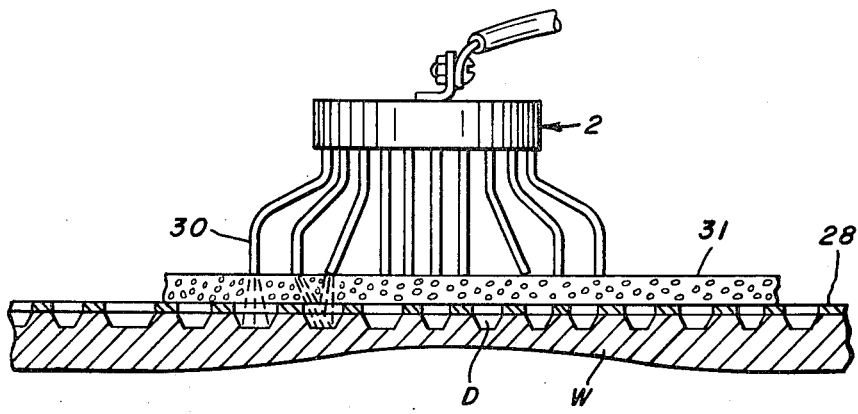
FIG. 2 is an enlarged view, partly in section, of the electrode and associated parts supported on a workpiece.

Referring more particularly to FIGS. 1 and 2 of the drawings, reference numeral 2 indicates the electrode of my invention, the details of which will be described later. The electrode 2 is connected by lead 4 to one terminal of a conventional D.C. power source 6 and metal workpiece W is connected to the other terminal by means of contact clip 8 and lead 10. The power source 6 includes a timer 12, power level control 14, interrupter switch 16, pilot light 18, on-off switch 20 and reset button 22. The power source 6 is energized by placing its terminal 24 in a 110 volt A.C. outlet. A foot switch 26 energizes the electrode 2. Since these parts are conventional and form part of a conventional power source they need not be described in detail. Suitable power sources are Catalogue Nos. V45A, VT45A and VTT45A sold by the Lectroetch Company of Cleveland, Ohio. A dielectric stencil 28 having the desired design is placed on the workpiece W over the surface to be embossed and a pad 31 saturated with electrolyte is placed on the stencil 28. Any suitable electrolyte may be used. When etching steel this may include a water solution of magnesium chloride, citric acid and sodium citrate. When etching lead the electrolyte may be a water solution of ammonium nitrate, citric acid and sodium citrate.

As shown in FIG. 3 the electrode 2 includes a plurality of stiff stainless steel wires 30 having one end soldered into a copper sleeve 32 which is surrounded by an insulating sleeve 34. A brass plug 36 also secured in sleeve 32 is threaded into a round brass rod 38. Lead 4 is soldered into rod 38 and the assembly enclosed in insulation 40 such as Micarta.

The electrode shown in FIG. 4 also includes a plurality of wires 30 which are bound together at one end by means of a spring wire 42 spirally wound about wires 30 and having an electrical terminal 44 for connection to lead 4. In both of these embodiments the wires 30 are spread apart at point 46 which is preferably between ¼ and one inch from their free end. The inner wires are relatively close together, but are spaced apart to permit escape of the gas which is generated in the electrolysis. The outer wires are relatively widely spaced so as to allow a visually feathered etching pattern to develop.

FIG. 6 shows another electrode of my invention which includes a conductive rod 48 having a conductive metal plate 50 at its free end. The plate 50 has a plurality of holes 52 therein to permit escape of evolved gases and a plurality of triangular cut out portions 54 around its outer periphery which form spaced peripheral points 56. Although the cut out portions 54 may be symmetrical, it is preferred that they be non-symmetrical as shown.

It will be noted that in all three embodiments shown the conductor or free end of the electrode has relatively closely spaced discharge areas or surfaces adjacent its center and relatively widely spaced discharge areas or surfaces at its outer portion or periphery.

Since my invention is of prime importance in repairing embossed sheets, the operation will be described with respect thereto. In repairing dented embossed sheets without the addition of material the operation is as follows:

If the dent is an inward dent or is not of sufficient height it is pressed out from the reverse side with an appropriate tool 58 (FIG. 7) until the bottom of depressions D at the dent are above the top of the surrounding surface. The damaged area is then filed down by file 60 until its top surface is in the same plane as the top of the surrounding surface as shown in FIG. 8. Oil and dirt are then removed from the damaged and surrounding area by means of a suitable solvent such as trichloroethylene or methyl ethyl ketone. The appropriate stencil 28 is then placed over the damaged area and the pad 31 saturated with electrolyte fluid placed on top of the stencil. The timer 12 is set for the appropriate time, preferably 30 seconds, and the power level 14 set for the appropriate level, preferably 70%. With the workpiece W insulated from ground the contact clip 8 is attached thereto. The interrupter switch 16 is turned on and the pilot light 18 will be on if everything is in order. If the light is not on, the reset button 22 is pushed and investigation made to determine any trouble. With everything in order, the electrode 2 is placed gently into the pad 30 over the damaged area and the switch 26 closed to energize the electrode. As the etching proceeds the electrode 2 is occasionally lifted, moved slightly in a generally circular direction and then gently lowered into the pad. This circular motion in small steps will help insure a "feathering" of the newly etched area into the adjacent embossed pattern. Each time the power is disconnected by timer 12 the electrode 2 is raised slightly, the pad 31 moistened with the electrolyte fluid and the electrode then lowered. The foot switch 26 is next released and then depressed, after which operation continues as before. When the embossing is completed to the desired depth and the switch 26 is opened, the power turned off and the pad 31 and stencil 28 removed. The electrolyte is then wiped from the repaired surface and a standard cleaner protector applied thereto with a cloth. This serves to neutralize the electrolyte and deposit a water soluble protective oil coating.

In repairing dented embossed sheets with the addition of material the operation is as follows: If the dent is an outward dent or is not of sufficient depth it is pressed out from the top side with tool 58 until the top of the damaged surface is substantially below the bottom of depressions D of the surrounding surface. Using heat, flux, and solder in the usual manner the depressed area is filled with lead L or other material having a melting point below that of the workpiece in the amount shown in FIG. 9. The lead is then filed down by file 60 until its top surface is in the same plane as the top of the surrounding surface as shown in FIG. 10. The operation then proceeds as before except that a different electrolyte will be used.

While several embodiments of my invention have been shown and described, it will be apparent that other adaptations and modifications may be made without departing from the scope of the following claims.

I claim:

1. Apparatus for etching the surface of a metal workpiece including an elongated electrode, said electrode comprising a plurality of electrically conductive metal wires, means holding the wires at one end in assembled relationship, and means at said one end adapted to be connected to one lead of a power source, the other end of said wires being free and forming a conductor end remote from said one end adapted to be positioned adjacent the workpiece, said conductor end having a plurality of spaced apart separate discharge surfaces formed by said wires, the discharge surfaces of said center wires at the free end being relatively closely spaced and the discharge surfaces of said outer wires at the free end being relatively widely spaced, said means holding the wires in assembled relationship including a conductive sleeve surrounding the ends of said wires, a conductive rod, means connecting said sleeve to said rod, an insulating sleeve surrounding said conductive sleeve and insulation surrounding said conductive rod.

2. Apparatus for etching the surface of a metal workpiece including an elongated electrode, said electrode comprising a plurality of elongated electrically conductive metal wires arranged side by side, means holding the wires at one end in assembled relationship, means at said one end adapted to be connected to one lead of a power source, the other end of said wires being free and each wire being arranged with its end surface a greater distance from the said one end than the remaining part of the wire, the free ends of said wires being arranged in spaced apart relationship to cover an extended surface having a center and an outer periphery, said end surfaces adapted to be positioned adjacent the workpiece and forming spaced apart separate discharge surfaces, the discharge surfaces adjacent the center being relatively closely spaced and the discharge surfaces adjacent the outer periphery being relatively widely spaced.

3. Apparatus according to claim 2 in which said means holding the wires in assembled relationship comprises a spring wire spirally wrapped around said wires.

4. Apparatus according to claim 2 in which said means holding the wires in assembled relationship comprises a conductive sleeve surrounding the ends of said wires, a conductive rod, means connecting said sleeve to said rod, an insulating sleeve surrounding said conductive sleeve, and insulation surrounding said conductive rod.

5. Apparatus according to claim 2 including a D.C. power source, means connecting one terminal of said power source to said workpiece, means connecting the other terminal of said power source to said electrode, a stencil adapted to be supported on said workpiece over the surface to be etched, and a pad adapted to be saturated with electrolyte fluid and adapted to be supported on said stencil.

6. Apparatus according to claim 5 in which said means holding the wires in assembled relationship comprising a spring wire spirally wrapped around said wires.

7. Apparatus according to claim 5 in which said means holding the wires in assembled relationship comprises a conductive sleeve surrounding the ends of said wires, a conductive rod, means connecting said sleeve to said rod, an insulating sleeve surrounding said conductive sleeve, and insulation surrounding said conductive rod.

References Cited

UNITED STATES PATENTS

| | | | |
|---|---|---|---|
| 349,535 | 9/1886 | Sohner | 204—224 X |
| 2,479,302 | 8/1949 | Bondley | 204—143 RX |
| 2,756,204 | 7/1956 | Higgins | 204—288 X |
| 2,106,004 | 1/1938 | Inglee | 204—224 X |
| 2,505,228 | 4/1950 | Chase | 204—271 |
| 3,061,526 | 10/1962 | Skolnick | 204—224 X |
| 2,482,486 | 9/1949 | Irish | 204—285 X |
| 3,207,685 | 9/1965 | Pavlic | 204—224 |
| 3,520,792 | 7/1970 | Kerschgens | 204—271 X |

JOHN H. MACK, Primary Examiner

D. R. VALENTINE, Assistant Examiner

U.S. Cl. X.R.

204—271, 289